(12) United States Patent
Schnelz

(10) Patent No.: US 8,414,724 B2
(45) Date of Patent: Apr. 9, 2013

(54) COMPOSITE TUBE HAVING COBONDED END FITTINGS AND METHOD OF MAKING SAME

(75) Inventor: James R. Schnelz, Seattle, WA (US)

(73) Assignee: The Boeing Company, Chicago, IL (US)

(*) Notice: Subject to any disclaimer, the term of this patent is extended or adjusted under 35 U.S.C. 154(b) by 1067 days.

(21) Appl. No.: 11/607,546

(22) Filed: Dec. 2, 2006

(65) Prior Publication Data

US 2008/0131630 A1 Jun. 5, 2008

(51) Int. Cl.
*B32B 37/00* (2006.01)

(52) U.S. Cl. ........ 156/172; 156/173; 156/175; 156/185; 156/187; 156/188; 156/192

(58) Field of Classification Search .......... 156/200, 156/196, 463, 172, 173, 175, 169, 185, 187, 156/188, 192
See application file for complete search history.

(56) References Cited

U.S. PATENT DOCUMENTS

| | | | |
|---|---|---|---|
| 2,076,632 A | 4/1937 | Goodall | |
| 2,848,133 A | 8/1958 | Ramberg | |
| 3,545,795 A | 12/1970 | Hertel et al. | |
| 3,850,722 A * | 11/1974 | Kreft ........................ | 156/172 |
| 4,089,190 A | 5/1978 | Worgan et al. | |
| 4,185,472 A | 1/1980 | Yates et al. | |
| 4,236,386 A | 12/1980 | Yates et al. | |
| 4,238,539 A | 12/1980 | Yates et al. | |
| 4,238,540 A * | 12/1980 | Yates et al. .................. | 428/35.9 |
| 4,256,412 A | 3/1981 | Tybus et al. | |
| 4,530,379 A | 7/1985 | Policelli | |
| 4,649,960 A | 3/1987 | Policelli | |
| 4,706,364 A | 11/1987 | Aubry | |
| 4,792,320 A | 12/1988 | Nickel | |
| 4,849,152 A | 7/1989 | Rumberger | |
| 4,851,065 A | 7/1989 | Curtz | |
| 5,281,454 A * | 1/1994 | Hanson ........................ | 428/36.3 |
| 5,288,109 A | 2/1994 | Auberon et al. | |
| 5,318,374 A | 6/1994 | Rumberger | |
| 5,332,049 A | 7/1994 | Tew | |
| 5,361,806 A | 11/1994 | Lalikos et al. | |
| 5,591,120 A | 1/1997 | Machida et al. | |
| 6,065,540 A | 5/2000 | Thomeer et al. | |

(Continued)

FOREIGN PATENT DOCUMENTS

| | | | |
|---|---|---|---|
| AU | 515017 B2 * | 3/1981 | |
| GB | 2112689 A | 7/1983 | |

(Continued)

OTHER PUBLICATIONS

Human Translation of Japanese Patent 63-015734 published Jan. 22, 1988.*

(Continued)

*Primary Examiner* — Jeff Aftergut

(74) *Attorney, Agent, or Firm* — Yee & Associates, P.C.

(57) ABSTRACT

A structural member such as a strut includes a composite material tube having metal end fittings that are attached to the tube by co-bonded, double shear joints. The double shear bond joint construction reduces the residual stress on the bonds that result from mismatch of the coefficients of thermal expansion of the composite tube and the metal end fittings. The ends of the fittings that are bonded to the tube may include a stepped profile that functions to limit the peak stresses in the bonds.

29 Claims, 6 Drawing Sheets

U.S. PATENT DOCUMENTS

| | | |
|---|---|---|
| 6,464,591 B1 | 10/2002 | Nakajima |
| 6,719,058 B2 | 4/2004 | Salama et al. |
| 6,863,279 B2 | 3/2005 | Salama |
| 6,893,733 B2 | 5/2005 | Obeshaw |
| 6,910,617 B2 | 6/2005 | Yablochnikov |
| 7,143,510 B2 | 12/2006 | Myers et al. |
| 7,427,237 B2 | 9/2008 | Burkett |
| 7,458,617 B2 | 12/2008 | Leslie et al. |
| 7,498,509 B2 | 3/2009 | Brotzell et al. |
| 7,655,581 B2 | 2/2010 | Goering |
| 7,731,593 B2 | 6/2010 | Dewhirst et al. |
| 7,943,535 B2 | 5/2011 | Goering et al. |
| 8,110,741 B2 | 2/2012 | Brotzell et al. |
| 2002/0106483 A1 | 8/2002 | Obeshaw |
| 2003/0106685 A1 | 6/2003 | Salama et al. |
| 2003/0107186 A1 | 6/2003 | Salama |
| 2004/0012198 A1 | 1/2004 | Brotzell et al. |
| 2004/0086341 A1 | 5/2004 | Salama et al. |
| 2005/0199308 A1 | 9/2005 | Swails et al. |
| 2006/0258469 A1 | 11/2006 | Dewhirst et al. |
| 2008/0129041 A1 | 6/2008 | Allen et al. |
| 2008/0261474 A1 | 10/2008 | Goering |
| 2009/0101328 A1 | 4/2009 | Leslie et al. |
| 2009/0278348 A1 | 11/2009 | Brotzell et al. |
| 2009/0311462 A1 | 12/2009 | Goering |

FOREIGN PATENT DOCUMENTS

| | | | |
|---|---|---|---|
| GB | 2383010 A | | 6/2003 |
| GB | 2424464 A | | 9/2006 |
| JP | 59-50216 A | * | 3/1984 |
| JP | 63-15734 A | * | 1/1988 |
| JP | 63-166522 A | * | 7/1988 |
| WO | 9737725 A2 | | 10/1997 |
| WO | WO-97/37725 A2 | * | 10/1997 |
| WO | 2005054694 A1 | | 6/2005 |
| WO | PCT/US 2007/021751 | | 10/2007 |
| WO | 2008066606 A1 | | 6/2008 |

OTHER PUBLICATIONS

Human Translation of Japanese Patent 59-050216 published Mar. 23, 1984.*
Human Translation of Japanese Patent 63-166522, date unknown.*
USPTO Requirement for Restriction dated Aug. 24, 2010 for U.S. Appl. No. 11/747,389, 6 pages.
Response to Requirement for Restriction dated Sep. 16, 2010 for U.S. Appl. No. 11/747,389, 5 pages.
USPTO Office Action dated Oct. 13, 2010 for U.S. Appl. No. 11/747,389, 10 pages.
Amendment after Non-Final Office Action dated Jan. 27, 2011 for U.S. Appl. No. 11/747,389, 11 pages.
USPTO Final Office Action dated Mar. 17, 2011 for U.S. Appl. No. 11/747,389, 13 pages.
Amendment submitted with RCE dated Jun. 27, 2011 for U.S. Appl. No. 11/747,389, 13 pages.
USPTO Office Action dated Aug. 30, 2011 for U.S. Appl. No. 11/747,389, 10 pages.
Amendment after Non-Final Office Action dated Dec. 1, 2011 for U.S. Appl. No. 11/747,389, 19 pages.
USPTO Final Office Action dated Dec. 30, 2011 for U.S. Appl. No. 11/747,389, 12 pages.
International Search Report, dated Mar. 7, 2008, regarding Application No. PCT/US2007/021751 (WO2008066606), 3 pages.
Amendment Pursuant to Request for Continued Examination, dated Mar. 30, 2012, regarding U.S. Appl. No. 11/747,389, 31 pages.
USPTO Office Action, dated Mar. 23, 2012, regarding U.S. Appl. No. 11/747,389, 11 pages.
USPTO Notice of Allowance, dated Oct. 1, 2012, regarding U.S. Appl. No. 11/747,389, 12 pages.

* cited by examiner

COMPOSITE TUBE HAVING COBONDED END FITTINGS AND METHOD OF MAKING SAME

TECHNICAL FIELD

This disclosure broadly relates to composite structural members, and deals more particularly with a composite tube having co-bonded metal end fittings, and a method for making the tube.

BACKGROUND

Structural members formed from both composite and metallic materials are used in a variety of applications in the aerospace industry. For example, structural members such as a strut may be formed from a composite material tube having metallic end fittings that attach the strut to other structure in an aerospace vehicle, such as a commercial aircraft. The strut may act as either a support or a connecting member, transferring force in either direction along the longitudinal axis of the strut. Thus, the strut may be subjected to either compressive or tension loading. The use of a composite tube normally provides a weight advantage over a metallic tube, while the use of metallic end fittings provides additional strength at points of attachment.

In some cases, the metallic end fittings may be attached to the composite tube using fasteners that pass through the tube and the fitting. This attachment technique may result in stress concentrations in the tube in the area around the fasteners, and therefore requires that the tube have a greater thickness in order to accommodate these localized stresses. This additional tube thickness increases both the weight of the structural member, and the cost of materials.

The use of fasteners may be obviated by bonding the end fittings directly to the composite tube. In order to form the attachment bond, a cylindrical section of the end fitting may be inserted into an open end of the tube and a bond is formed at the overlapping, contacting areas between the interior wall of the tube and the exterior wall of the end fitting. The axial length of the bond must be sufficient to withstand shear forces produced by the compression and/or tension loads which the structural member is designed to transfer. Higher loading therefore requires a longer bond length between the end fitting and the tube. Longer bond lengths create a problem, however, due to the difference in the coefficients of thermal expansion (CTE) of the composite tube compared to metal end fittings. This problem is due, in part to the process used to produce the bond. The bonding process involves curing the composite materials forming the tube at elevated temperature while the metal fitting is attached to the tube. In some cases, the metal fitting may be bonded to a prefabricated tube. In either case, the metal fitting expands a greater amount than the tube during the curing process, since the CTE of metal is higher than that of the composite material. Subsequent cooling of the metal and composite material results in the metal and the composite material contracting at different rates, producing residual stresses in the bond area. The residual stresses may be exacerbated as a result of the bond being subjected to thermal cycling and tension and/or compression loading during in-flight service. Thermal cycling may occur during typical aircraft operations when aircraft components are exposed to temperatures of about 90° F. or more on the ground to as low as about −60° F. or lower at typical flight altitudes.

Accordingly, there is a need for a bond construction that overcomes the problems mentioned above. Embodiments of the disclosure are directed toward satisfying this need.

SUMMARY

An embodiment of the disclosure may include a method for making a structural member, such as a strut. The method may include the steps of: forming an inner composite tube wall portion; placing at least one fitting over an end of the inner tube wall portion; forming an outer composite tube wall portion over the inner tube wall portion and the fitting; and, co-bonding both the inner tube wall portion and the outer tube wall portion to the fitting. The inner composite tube wall portion may preferably be made by forming a lay-up of composite material over a mandrel, curing the lay-up after the fitting has been placed over the end of the tube wall portion, and then removing the mandrel from the lay-up after the lay-up has been cured. The lay-up of the inner composite tube wall portion is preferably compacted or debulked before the fitting is placed on the end of the tube wall portion. The method may further include inserting the mandrel into a mandrel mold and expanding the mandrel to form the mandrel into a desired mandrel shape. The lay-up that forms the inner tube wall portion may be made by wrapping plies of composite material at least partially around the mandrel so that the lay-up can expand during any subsequent processing step.

In accordance with another embodiment, a method may be provided for making a composite aircraft strut having a metal end fitting. The method may include the steps of: forming a first lay-up of composite material defining an inner tube wall portion; placing at least a section of a fitting over an end of the inner tube wall portion, forming a second lay-up of composite material over the first lay-up and the fitting section, the second lay-up defining an outer tube portion covering the first tube wall portion and the fitting section; and, co-bonding both the inner and outer tube wall portions to the fitting section. The first lay-up may be formed by laying up plies of composite material partially around a mandrel, and then debulking the lay-up. The second lay-up may be formed by wrapping uncured plies of a fiber reinforced polymer material over the first lay-up and over the fitting section. Co-bonding of the metal fitting with the inner and outer tube wall portions may result in a double shear bond that is relatively short in length.

According to another embodiment, a structural member may include: a composite material tube having co-bonded inner and outer tube wall portions; and, a metal fitting having at least a section disposed between and co-bonded to the inner and outer tube wall portions. The fitting section forms a first bond joint with the inner tube wall portion and a second bond joint with the outer tube wall portion, providing a double shear bond. In one embodiment, the bond joints may be scarf joints, while in another embodiment, the joint may have steps of decreasing thickness in an axial direction. The double shear bond joint may reduce stress on the bond resulting from the mismatch of the coefficients of thermal expansion of the metal fitting and the composite tube. Co-bonding of the fitting with the composite tube results in a bond strength that may satisfy design load requirements, without the need for fasteners, although fasteners may also be used.

The co-bonded double shear joint of at least one embodiment may also reduce the residual stresses present in the bond to acceptable levels, and may also peel stresses in the joint, especially at the ends of the joint. The double shear joint construction is also advantageous in that the eccentricity of the components forming the joint may be reduced.

These and further features, aspects and advantages of the embodiments will become better understood with reference to the following illustrations, description and claims.

BRIEF DESCRIPTION OF THE ILLUSTRATIONS

Figure 16:
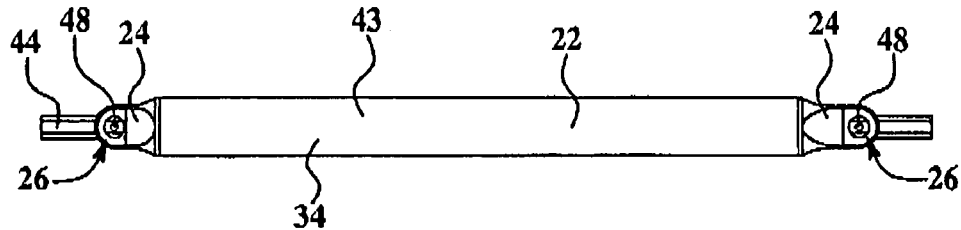

FIG. 16 a side illustration showing the second lay-up having been applied over sections of the end fittings and the first lay-up to form an outer tube wall portion.

Figure 17:
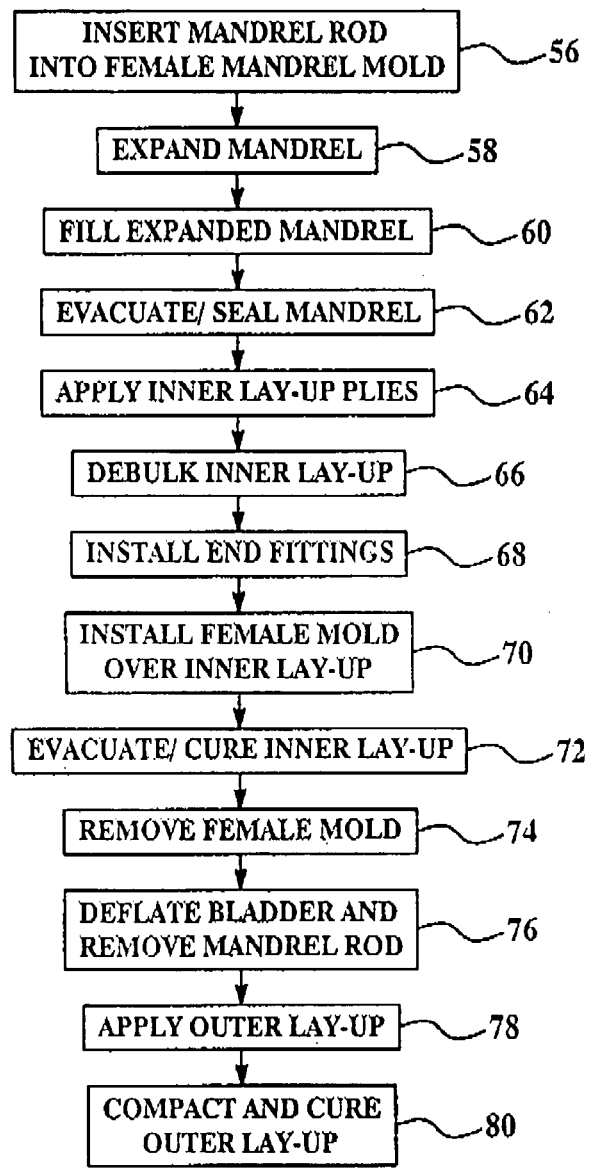

FIG. 17 is a simplified flow diagram showing the steps for making the composite tube having co-bonded end fittings according to an embodiment.

DETAILED DESCRIPTION

Figure 1:
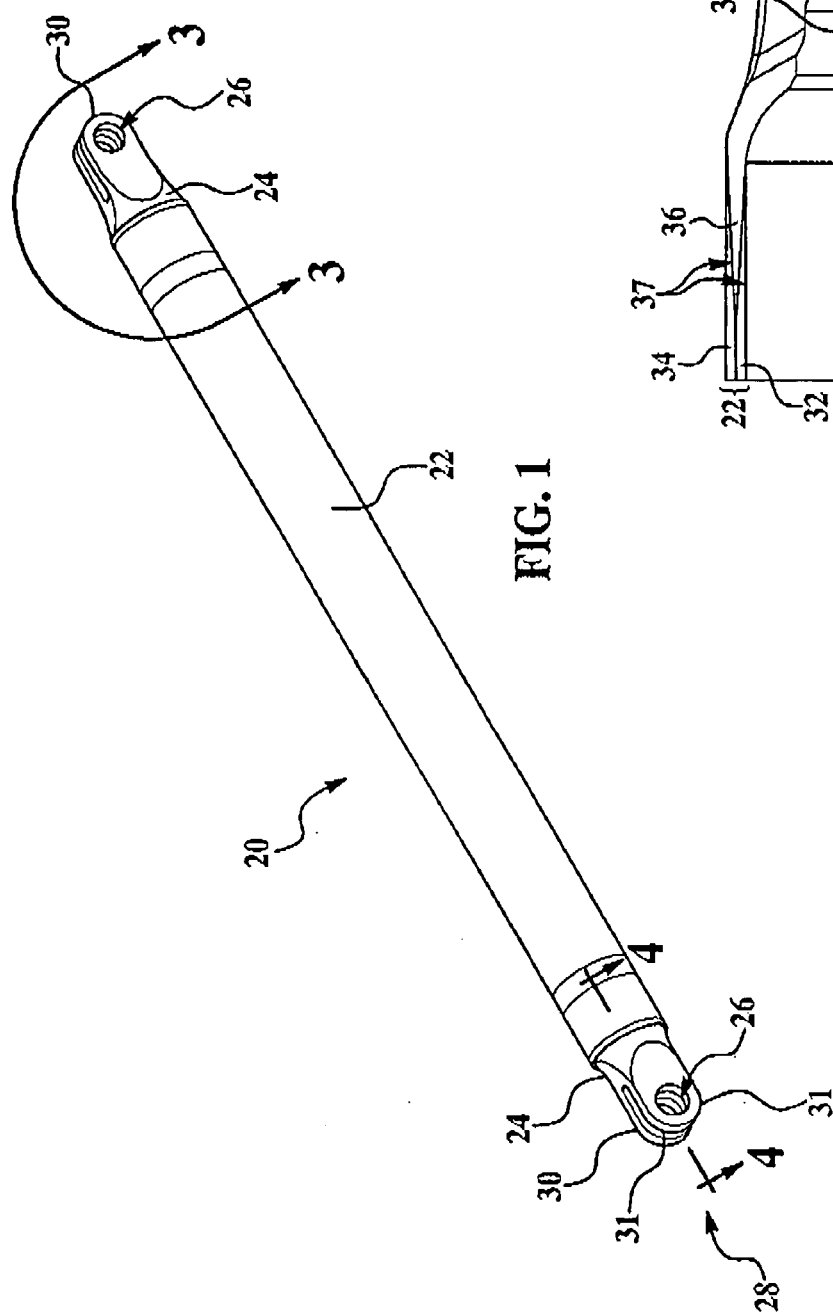
FIG. 1 is a perspective view of a strut having a composite material tube and metallic end fittings, according to an embodiment.
Figure 2:
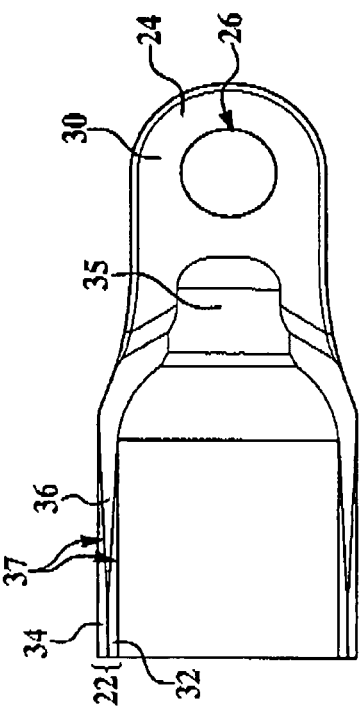
FIG. 2 is a longitudinal section illustration of an end of the strut depicted in FIG. 1, showing the use of a scarf joint according to one embodiment.
Figure 3:
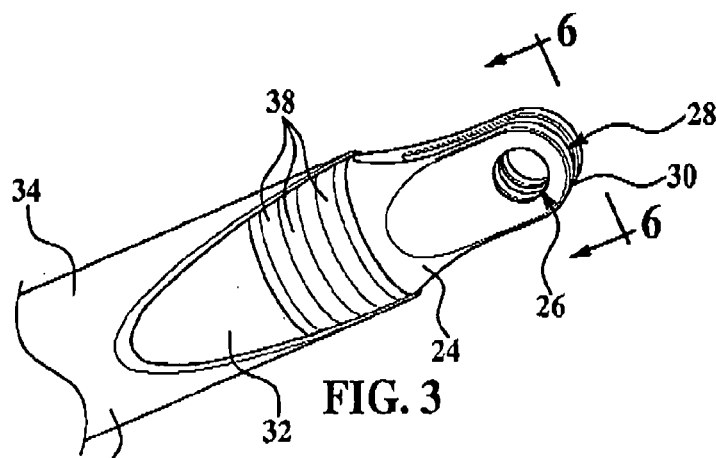
FIG. 3 is a perspective illustration of one end of the strut shown in FIG. 1, a portion of the outer tube wall portion having been broken away to reveal the inner tube wall.

Referring first to FIGS. 1 and 2, a structural member in the form of a strut 20 may comprise a cylindrical tube 22 and a pair of end fittings 24 secured to the opposite ends of tube 22 by double shear bonds. The tube 22 may comprise, but is not limited to a composite material, such as multiple laminated plies of a fiber reinforced polymer resin. An example of multiple plies of a fiber reinforced polymer resin may be carbon fiber reinforced epoxy. The tube 22 may include an inner tube wall portion 32, and an outer tube wall portion 34 which are co-bonded, as shown in FIG. 2 as a cylinder. Cylindrical tube 22 may have other cross sectional shapes such as, but not limited to square, triangle, hexagon, or pentagon.

Each of the end fittings 24 may be, but is not limited to a metal such as aluminum or titanium, or a composite end fitting. A metallic end fitting may be formed by casting, machining or other common manufacturing techniques. A composite end fitting may include metallic inserts and/or metallic bushings. Each of the end fittings 24 may include a clevis 30 provided with aligned openings 26. While a double tab 31 configuration is shown, a single tab or triple tab configuration or more than 3 tab configurations are within the scope of the embodiments of the disclosure. The openings 26 may allow the strut 20 to be connected by pins (not shown) or other pivoting and/or fastening means to structural components, such as in an aircraft. Depending upon the particular application, strut 20 may function to transfer axial loads bi-directionally, so that the strut 20 may be either placed in tension or compression, or both in alternating fashion, along its central axis. Each of the end fittings 24 may include an axial opening 28 that is aligned with the central axis of the tube 22 for purposes which will become apparent later.

As best seen in FIG. 2, each of the end fittings 24 may include an interior area 35 that is generally hollow in order to reduce the weight of the end fitting 24, and a cylindrical end section 36, although configurations other than cylindrical are contemplated. The cylindrical end section 36 may have a tapered cross section that is disposed between and co-bonded to the inner and outer tube wall portions 32, 34, respectively. As will be discussed later, the inner and outer tube wall portions 32, 34, may be formed from laminates having tapered profiles that complementary match the tapered cross section of the cylindrical end section 36 so as to define a double scarf joint 37. The inner and outer tube wall portions 32, 34, respectively form, in combination with the cylindrical end section 36, an overlapping, double shear bond at the scarf joint 37.

While not shown, a coupling means, such as, but not limited to a fastener may couple wall portions 32 and 34 to cylindrical end section 36. A coupling means may work with co-bonding or singularly without co-bonding.

Figure 4:
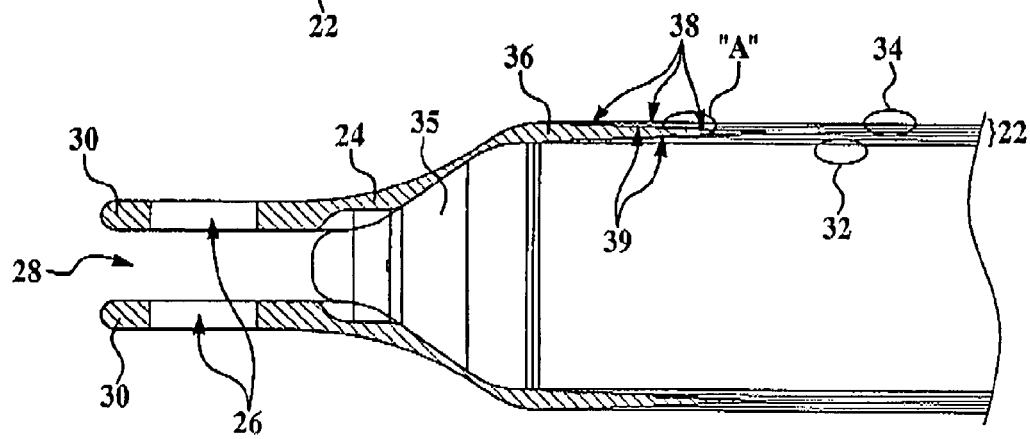
FIG. 4 is a longitudinal sectional illustration taken through the end of the strut shown in FIG. 1, but depicting a stepped bond joint which forms another embodiment.
Figure 5:
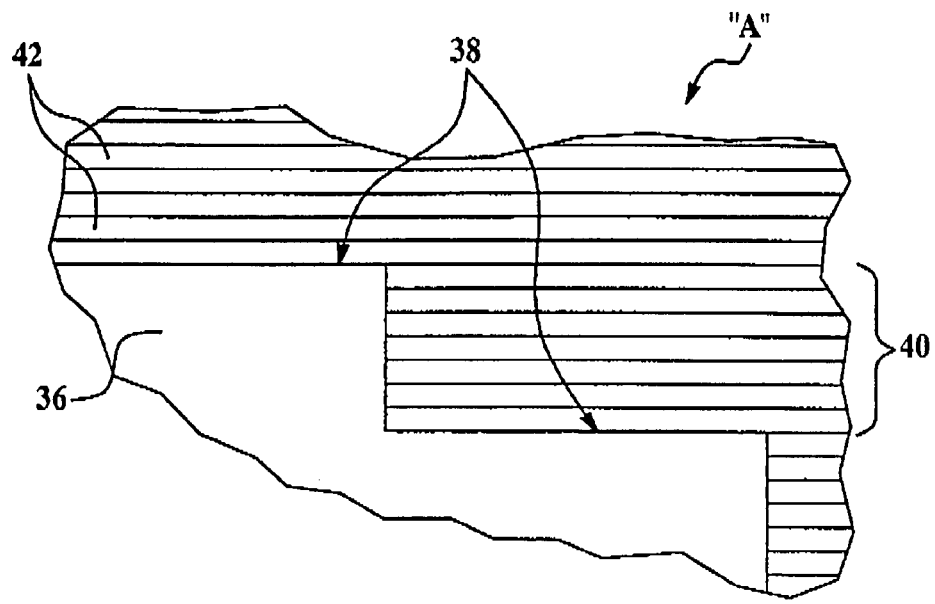
FIG. 5 is an enlarged illustration of a section of the stepped bond joint shown in FIG. 4, designated as "A".
Figure 6:
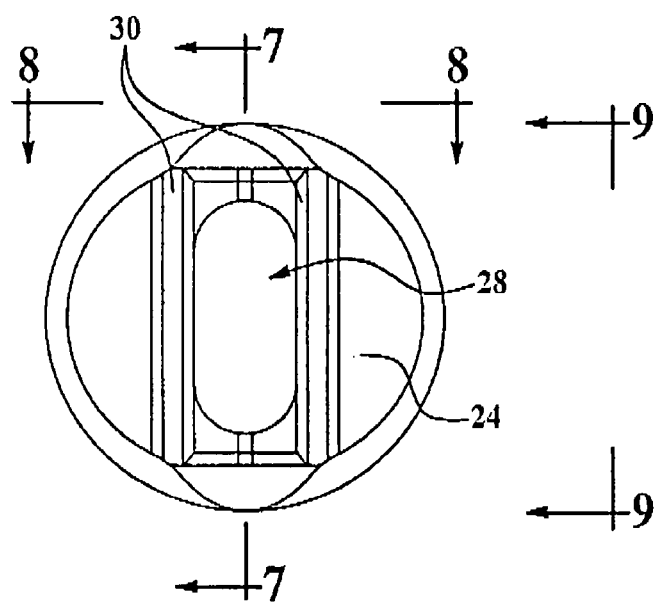
FIG. 6 is an end illustration of the end fitting shown in FIG. 3.
Figure 7:
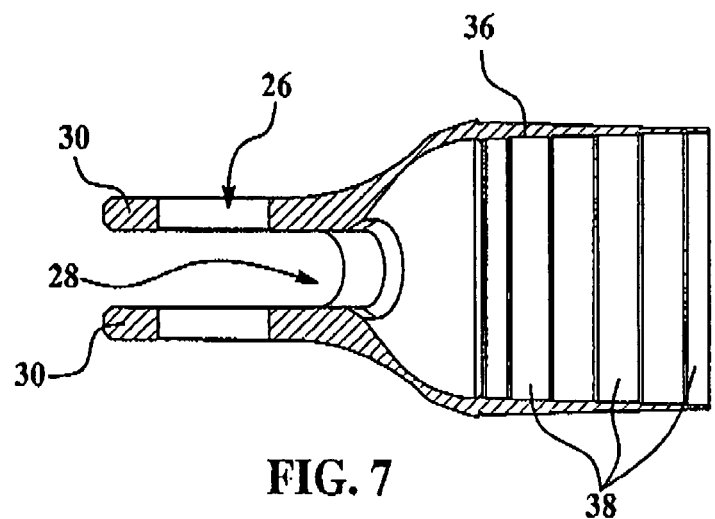
FIG. 7 is a sectional illustration taken along the line 7-7 in FIG. 3.
Figure 8:
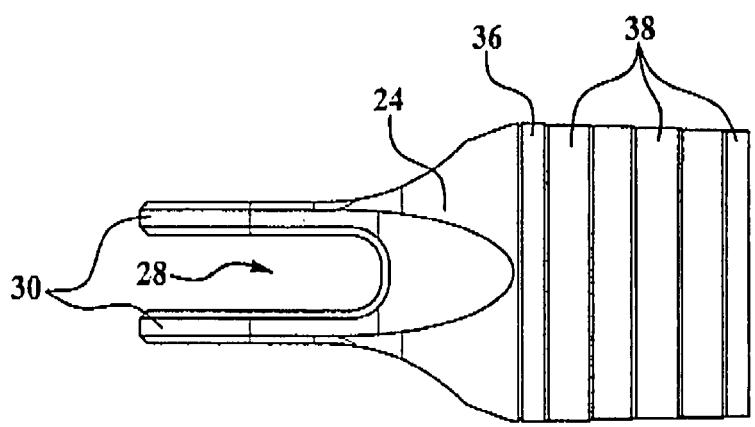
FIG. 8 is a plan illustration of the end fitting shown in FIG. 6.
Figure 9:
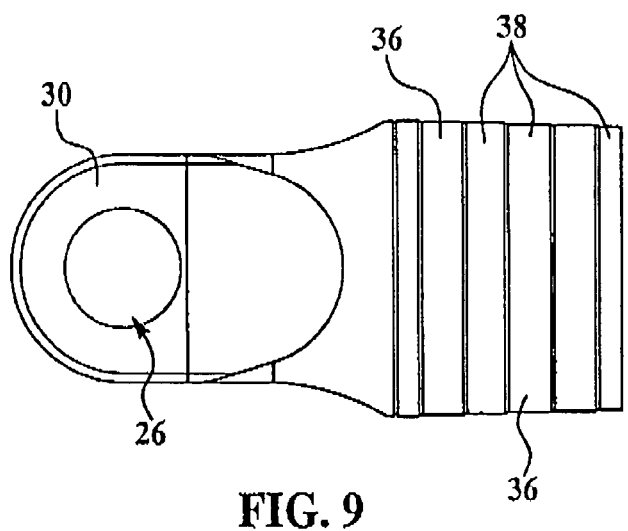
FIG. 9 is a side illustration of the end fitting shown in FIG. 6.

Reference is now made to FIGS. 3-9 which depict an alternate construction of the composite tube 22 having co-bonded end fittings 24. The cylindrical end section 36 of each of the end fittings 24 may be provided with a plurality of inner and outer, circumferential steps 38 such that the thickness of cylindrical end section 36 progressively decreases in the direction away from axial opening 28. As can be seen in FIGS. 4 and 5, the inner and outer tube wall portions 32, 34 each may comprise a plurality of plies of composite material, such as, but not limited to a fiber reinforced polymer resin which may be fabricated using techniques described later below. The laminated plies 42 (FIG. 5) may be arranged in groups 40 having progressively greater lengths in the direction of the end fitting 24. Each ply group 40 terminates at an end of one of the steps 38, so that the plies 42 are effectively tailored in their lengths to complementary match the profile of the steps 38. The plies 42 are layed up to form the inner and outer tube wall portions 32, 34 which may be co-bonded along with the cylindrical end section 36 to form a doubled stepped bond joint 39. The use of the steps 38 may effectively divide the total amount of the residual stress in the resulting bond so that these stresses peak at each step 38. In some applications, the stepped, double shear bond joint 39 shown in FIG. 4 may be preferable to the double scarf joint 37 described in connection with FIG. 2.

Figure 10:
FIG. 10 is a side illustration of a mandrel rod having an expandable mandrel shown in a deflated condition.

Attention is directed to FIG. 17 along with FIGS. 10-16 which depict the steps in making the composite tube 22 having co-bonded end fittings 24 described above in connection with FIGS. 1-9. As shown in FIG. 10, a mandrel rod 44 is provided with an expandable mandrel 46 that may circumscribe rod 44. In the illustrated example, the expandable mandrel 46 may comprise a flexible, inflatable bladder. Mandrel rod 44 may include a pair of indexing marks 48 on opposite ends thereof, for purposes that will become apparent later.

Figure 11:
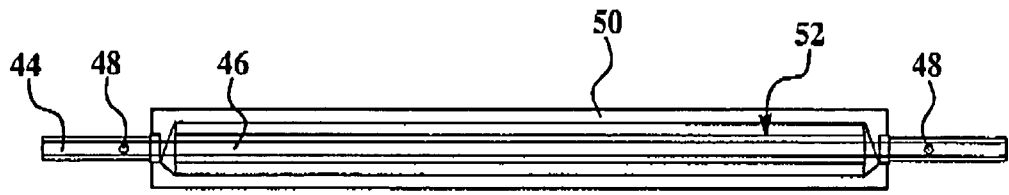
FIG. 11 is a longitudinal sectional illustration of a female mandrel mold into which mandrel rod depicted in FIG. 10 has been inserted.
Figure 12:
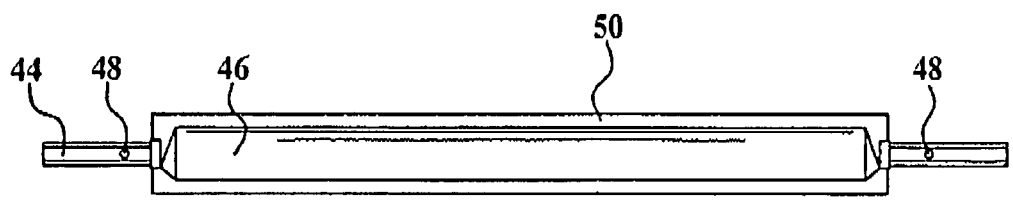
FIG. 12 is an illustration similar to FIG. 11, but showing the mandrel having been inflated.

Beginning with step 56, the mandrel rod 44 may be axially inserted into a female bladder mold 50, as shown in FIG. 11, which has an interior cavity wall 52 corresponding to the desired shape of a mandrel to be formed. The mold 50 may then be evacuated, causing the flexible bladder 46 to expand within the cavity 52. Next, at step 58, the expandable mandrel 46 may be filled with a granular material such as, but not limited to sand or ceramic beads. A pressurized source of the granular material may be connected to an axial conduit (not shown) within the mandrel rod 44, which in turn is connected with the interior of the flexible mandrel 46. Next, at step 62, the flexible mandrel 46 may be sealed and evacuated to form a partial vacuum. This partial vacuum may compress the flexible mandrel 46 against the granulated filler material so as to make it somewhat rigid and assume the desired mandrel shape. It should be noted here that other types of constructions could be used to form the flexible mandrel 46. For example, an expandable metal or break-down mandrel (not shown) could be employed for ply lay-up rather than the flexible bladder 46 illustrated in the drawings. The flexible mandrel 46 or other known, internal bagging material may then be used during lay-up and/or for curing of the inner lay-up 41.

Figure 13:
FIG. 13 is a side illustration of the mandrel wrapped with multiple plies of fiber reinforced material to form an inner tube wall portion.
Figure 14:
FIG. 14 is an illustration similar to FIG. 13, but showing the first lay-up having been debulked and end fittings having been installed over the inner tube wall portion.

At step 64, multiple hoop plies of a composite material may be applied to the rigid mandrel 46, as shown in FIG. 13, resulting in the formation of a first, inner lay-up 41 that may define the inner tube wall portion 32. The plies forming inner lay-up 41 may comprise, for example, successive, uncured layers of carbon reinforced epoxy material in the form of sheets or a tape in which the orientation direction of the reinforcing fiber alternates according to known ply orientation schemes. The inner lay-up 41 may be formed by wrapping each of the hoop plies one revolution (360 degrees) or less around the mandrel 46. In other words, wrap each hoop ply of the inner lay-up 41 around the mandrel 46 only once or less. By avoiding plies that wrap more than one revolution, the reinforcing fibers are allowed to move radially during subsequent compaction of the inner lay-up 41.

At step 66, the inner lay-up 41 may be debulked to remove excess air from the lay-up plies and thereby better consolidate the plies. The debulking process may be carried out within a vacuum bag (not shown) using vacuum pressure.

Next, at step 68 the end fittings 24 are installed over the inner lay-up 41. This step is carried out by passing the end fittings 24 over the ends of the mandrel rod 44, allowing the mandrel rod 44 to pass through the axial openings 28 in the end fittings 24. The cylindrical end sections 36 of the end fittings 24 are sleeved over the inner lay-up 41. As previously indicated, the lengths of the plies forming the inner lay-up 41 may be tailored so as to either match the tapered cross section of the cylindrical end section 36 of the end fitting 24 shown in FIG. 2, or the steps 38 of the end fitting 24 shown in FIGS. 4 and 5. As the end fittings 24 are installed over the outer ends of the inner lay-up 41, the indexing marks 48 may be used to align the end fittings 24 relative to each other so that the openings 26 in the clevis of the two fittings 24 are in a desired rotational position relative to each other.

Figure 15:
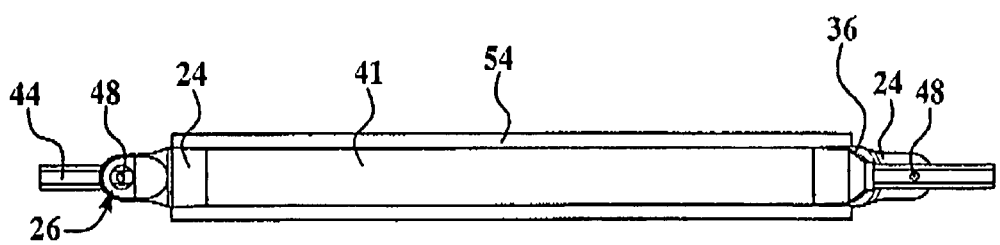
FIG. 15 is an illustration similar to FIG. 14 but showing the first lay-up having been placed in a lay-up mold for compaction and curing.

At step 70, a female mold 54 may be placed over the inner lay-up 32 and the cylindrical end section 36, as can be seen in FIG. 15. The female mold 54 may be evacuated, creating a partial vacuum that draws bladder 46 shown in FIG. 12 and the plies in the inner lay-up 41 into contact with the interior walls of the female mold 54 shown in FIG. 15 thereby compacting the plies. The female mold 54 may be placed in an autoclave and heated to the necessary temperature in order to cure the inner lay-up either during or after the compaction process.

Next, the female mold 54 may be removed at step 74. At this point, the inner lay-up 41 defining the inner tube wall portion 32 may be fully compacted and cured, and may be co-bonded to the inside face of the cylindrical end section 36 of end fitting 24. Then, at step 76, the expandable bladder mandrel 46 may be deflated and the mandrel rod 42 is removed from the strut 22

At step 78, multiple, uncured plies of composite material may be applied over the inner tube wall portion 32 as well as over cylindrical end sections 36 to form a second, outer lay-up 43 that defines the outer tube wall portion 34. The plies in the outer lay-up 43 may be similar or dissimilar to those used in the inner lay-up, comprising, for example, carbon fiber reinforced epoxy resin, in which the plies are arranged in alternating layers of multiple fiber orientations. (e.g. +45/0/90). Other ply orientations may be used. The plies in the outer lay-up 43 may be wrapped one or more times around the inner lay-up 41. Like the inner lay-up 41, the plies in the outer lay-up 43 may be tailored in length so as to conform to either the profile of the unstepped tapered cylindrical end section 36 shown in FIG. 2, or the stepped cylindrical end section 36 shown in FIGS. 4 and 5. It should be noted here that the number of piles used to form the inner and outer lay-ups 41, 43 respectively may vary depending on the particular application and performance requirements. In one embodiment for example, a build up of 33 plies was found to be satisfactory for the inner lay-up 41 and 33 plies on the outer lay-up 43 as well.

Figure 4A:
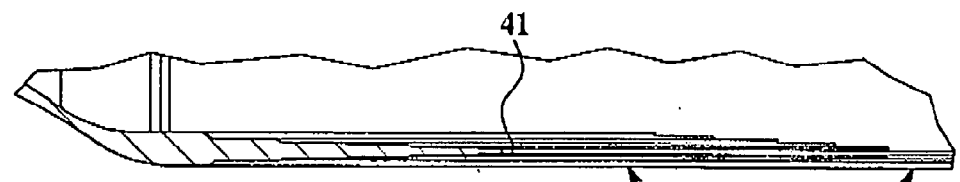
FIG. 4A is a fragmentary, longitudinal section illustration taken through the end of the strut shown in FIG. 1, but showing an alternate lay-up arrangement.
Figure 4B:
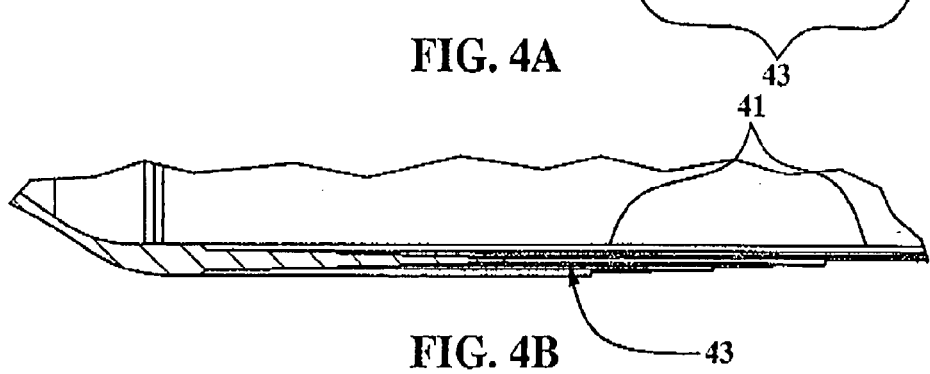
FIG. 4B is a fragmentary, longitudinal section illustration taken through the end of the strut shown in FIG. 1, but showing another lay-up arrangement.

It may also be possible for an inner lay-up 41 or an outer lay-up 43 to not extend the entire length of cylindrical tube 22. As shown in FIGS. 4A and 4B, inner lay-up 41 or outer lay-up 43 may taper over a bond to outer lay-up 43 or inner lay-up 41, respectively. Tapering sections on both tube, ends may form a double butted cylindrical tube 22. In another embodiment, a single butted tube may be formed.

At step 80, the outer lay-up 43 may be subjected to compaction and curing using conventional techniques. For example, the strut 22 may be vacuum bagged with the vacuum bag being evacuated and placed in an autoclave (not shown) at elevated temperature until the outer lay-up 43 may be fully compacted and cured. As a result of this compaction and curing process, the outer lay-up 43 forming the outer tube wall portion 34 is co-bonded with the inner tube wall portion 32 and with the outer face of the cylindrical end section 36 on the end fittings 24.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of making a structural member, comprising the steps of:

forming an inner composite tube wall portion having a first end and a second end comprising a lay-up of uncured composite material, forming comprising wrapping a plurality of uncured plies of a fiber reinforced polymer material onto a mandrel to form, a number of the plurality of uncured plies being wrapped one revolution or less around the mandrel;

coupling a first fitting over at least a portion of the first end of the inner composite tube wall portion and curing said inner composite tube wall portion with said fitting in place;

forming an outer composite tube wall portion comprising a second lay-up of uncured composite material over at least a portion of the inner tube wall portion and the first fitting following the coupling of the first fitting over at least a portion of the first end of the inner composite tube wall portion and curing said inner composite tube wall portion with said fitting in place; and, co-bonding the inner composite tube wall portion, the outer composite tube wall portion, and the first fitting by curing said second lay-up.

2. The method of claim 1, wherein forming the inner composite tube wall portion further comprises compacting the lay-up to form a compacted lay-up.

3. The method of claim 2, wherein forming the inner composite tube wall portion further comprises placing a female mold over the compacted lay-up.

4. The method of claim 3, wherein forming the inner composite tube wall portion further comprises sealing the female mold to the compacted lay-up to form a chamber therebetween.

5. The method of claim 4, wherein forming the inner composite tube wall portion further comprises evacuating the chamber.

6. The method of claim 1, further comprising the steps of:
inserting the mandrel into a mandrel mold,
expanding the mandrel within the mold to form the mandrel into a desired mandrel shape; and,
removing the mold.

7. The method of claim 6, further comprising the steps of:
placing a second fitting over at least a portion of the second end of the inner tube wall portion, and
indexing a rotational position of the first fitting relative to a rotational position of the second fitting using indexing marks on the mandrel.

8. The method of claim 6, wherein expanding the mandrel is performed by inflating the mandrel.

9. The method of claim 1, wherein forming the outer composite tube wall portion includes:
laying a number of plies of composite material over the inner tube wall and over the fitting,
compacting the number of plies to form a number of compacted plies; and,
curing the number of compacted plies.

10. The method of claim 1, wherein said structural member comprises an aircraft strut.

11. The method of claim 1, wherein said fitting forms a first bond joint with the inner tube wall portion, and a second bond joint with the outer tube wall portion.

12. The method of claim 1, wherein the fitting includes a cylindrical wall having a tapered thickness, said tapered thickness decreasing in a direction toward said tube wall portions, and, the inner and outer tube wall portions on either side of said fitting each have a taper complementing the tapered thickness of the fitting.

13. The method of claim 1, wherein the number of the plurality of uncured plies comprise hoop plies.

14. The method of claim 1, wherein the plurality of uncured plies are configured to allow reinforcing fibers of the plurality of uncured plies to move radially during a subsequent compaction of the lay-up.

15. A method of making a composite aircraft strut having a metal fitting, comprising the steps of:
forming a first lay-up of uncured composite material defining an inner tube wall portion having a first end and a second end, forming comprising wrapping a plurality of uncured plies of a fiber reinforced polymer material onto a mandrel, a number of the plurality of uncured plies being wrapped one revolution or less around the mandrel;

coupling at least a section of a metal fitting over at least a portion of the first end of the inner tube wall portion to create a fitting section and curing said inner tube wall with said metal fitting in place;

forming a second lay-up of composite material over the first lay-up and at least a portion of the fitting section, the second lay-up defining an outer tube wall portion covering the inner tube wall portion and the fitting section; and, co-bonding the inner tube wall portion, the outer tube wall portion, and the fitting section by curing said second lay-up.

16. The method of claim 15, further comprising the steps of:
compacting the plies laid up on the mandrel.

17. The method of claim 15, further comprising the steps of:
inserting the mandrel into a mandrel mold,
expanding the mandrel within the mold to form the mandrel into a desired mandrel shape; and,
removing the mandrel mold before the plies are laid up on the mandrel.

18. The method of claim 15, wherein:
forming the second lay-up of composite material over the first lay-up and at least a portion of the fitting section further includes wrapping uncured plies of a fiber reinforced polymer material over the first lay-up and over at least a portion of the fitting section.

19. The method of claim 18, wherein forming the second lay-up of composite material over the first lay-up and at least a portion of the fitting section and further wrapping uncured plies of the fiber reinforced polymer material over the first lay-up and over at least a portion of the fitting section, still further comprises compacting the uncured plies.

20. The method of claim 15, wherein the number of the plurality of uncured plies comprise hoop plies.

21. The method of claim 15, wherein the plurality of uncured plies are configured to allow reinforcing fibers of the plurality of uncured plies to move radially during a subsequent compaction of the first lay-up.

22. A method of making a structural member, comprising the steps of:
forming an inner composite tube wall portion comprising a lay-up of uncured composite material, forming comprising wrapping a plurality of uncured plies of a fiber reinforced polymer material onto a mandrel, a number of the plurality of uncured plies being wrapped one revolution or less around the mandrel;

coupling a fitting over at least a portion of an end of the inner composite tube wall portion and curing said inner composite tube wall portion with said fitting in place;

forming an outer composite tube wall portion comprising a second lay-up of uncured composite material over at least a portion of the inner tube wall portion and the fitting following curing of said inner composite tube and said fitting;

co-bonding the inner composite tube wall portion, the outer composite tube wall portion, and the fitting to form a joint by curing said second lay-up; and wherein the fitting includes a cylindrical wall having a tapered thickness, said tapered thickness decreasing in a direction toward said tube wall portions, and, the inner and outer tube wall portions on either side of said fitting each have a taper complementing the tapered thickness of the fitting.

23. The method of claim 22, wherein the step of forming the inner composite tube wall portion further comprises compacting the lay-up of uncured composite material.

24. The method of claim 23, wherein the compacting further comprises placing a female mold over the lay-up of uncured composite material.

25. The method of claim 22, wherein, before the lay-up of uncured composite material is formed over the mandrel, the mandrel is first inserted into a mandrel mold, expanded within the mold to form the mandrel into a desired mandrel shape, and then removed from the mold.

26. The method of claim 22, wherein the step of forming the outer composite tube wall portion further comprises:
    laying plies of composite material over the inner tube wall and over the fitting,
    compacting the plies to form a lay-up of compacted plies, and,
    curing the lay-up of compacted plies.

27. The method of claim 22, wherein said structural member comprises an aircraft strut.

28. The method of claim 22, wherein the number of the plurality of uncured plies comprise hoop plies.

29. The method of claim 22, wherein the plurality of uncured plies are configured to allow reinforcing fibers of the plurality of uncured plies to move radially during a subsequent compaction of the lay-up.

* * * * *